Feb. 3, 1970  F. B. KLEINDIENST  3,493,236
SOCKET PIPE SEALING ASSEMBLY
Filed May 11, 1966  6 Sheets-Sheet 1

INVENTOR
Friedrich Bernhard Kleindienst
BY
ATTORNEY

Feb. 3, 1970   F. B. KLEINDIENST   3,493,236
SOCKET PIPE SEALING ASSEMBLY
Filed May 11, 1966   6 Sheets-Sheet 3

INVENTOR
Friedrich Bernhard Kleindienst

BY *Otto John Munz*
ATTORNEY

Feb. 3, 1970   F. B. KLEINDIENST   3,493,236
SOCKET PIPE SEALING ASSEMBLY
Filed May 11, 1966   6 Sheets-Sheet 6

INVENTOR
Friedrich Bernhard Kleindienst

BY
ATTORNEY

United States Patent Office 3,493,236
Patented Feb. 3, 1970

3,493,236
SOCKET PIPE SEALING ASSEMBLY
Friedrich Bernhard Kleindienst, Heidelberg, Germany, assignor to Deutsche Steinzeug-u. Kunststoffwarenfabrik für Kanalisation und Chemische Industrie
Filed May 11, 1966, Ser. No. 549,346
Claims priority, application Germany, May 15, 1965,
D 47,283; Dec. 21, 1965, D 48,973, D 48,974
Int. Cl. F16j 15/02; F16l 21/02
U.S. Cl. 277—178
16 Claims

ABSTRACT OF THE DISCLOSURE

A sealing assembly for pipes comprising a rigid pipe socket, a rigid pipe spigot, a resilient sealing gasket, and a cast sealing cylinder, all in coaxial alignment. The resilient sealing gasket has an external sealing means fitting in an annular recess in the internal surface of the socket thereby forming a ring-shaped mold.

---

The present invention relates to the sealing of connections between rigid pipes and especially between ceramic sewer pipes.

The primary object of the present invention is to provide a socket pipe sealing assembly that can be easily and economically made.

Further objects of the present invention are to provide a pipe sealing assembly to produce efficient and effective sealing of ceramic pipes having conventional manufacturing tolerances; to provide a sealing assembly that can be delivered with the pipe as a securely attached unit; to provide a sealing assembly that can be attached internally in the pipes and thus avoid damaging during handling and delivery; to provide a sealing assembly that can absorb the effect of a slight crack arising from ground pressure; to provide a sealing assembly that does not necessitate or result in an enlargement of the socket diameter; to provide a sealing assembly allowing a maximum axial movability of two connected pipes while maintaining an effective seal; to provide a novel double-lip construction that improves sealing under difficult pipe surface conditions and that is also easy to manufacture; to provide a sealing assembly that is effective even when the shapes of socket and spigot deviate randomly from perfect roundness; and to overcome the disadvantage of conventional socket pipe packings.

The objects and many of the attendant advantages of this invention will be readlily appreciated as the same becomes better understood by reference to the following detailed description when considered in connection with the accompanying drawings in which like reference numerals designate like parts throughout the figures thereof and wherein.

Figure 1:
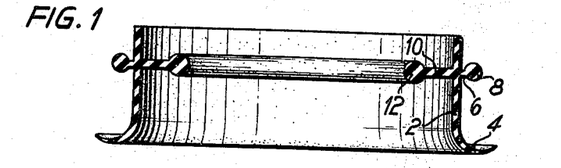
FIGURE 1 shows a longitudinal cross-section of a gasket of the invention.

The gasket of FIGURE 1 is provided with a cylindrical shell 2 with an externally projecting sealing lip 4 at the bottom. This lip is concave as seen from the top. At a certain distance from this sealing lip 4, external mounting means are provided which, in the present case, consist of small rods 6 with balls 8. Approximately opposite to these rods 6, a ring 10 is provided which extends radially toward the inside, this ring carrying at its end an O-ring 12. The rings 10 and 12 serve as the internal sealing lip. The O-ring 12 is a reinforcement at the internal rim of the lip.

Figure 2:
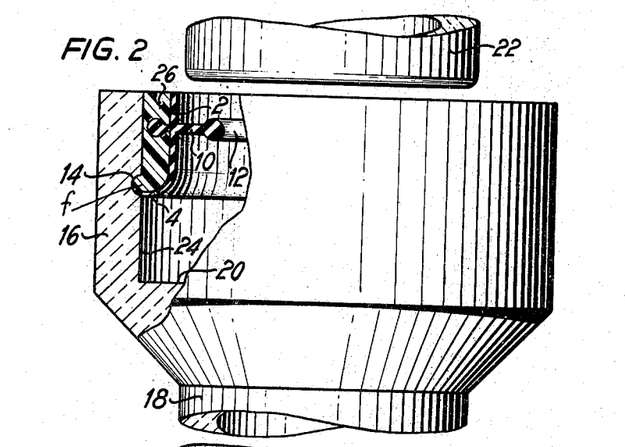
FIGURE 2 shows a longitudinal cross-section of a socket (bell), a gasket and a sealing cylinder in assembly with spigot about to be inserted.

FIGURE 2 shows this gasket, whose parts are provided with the same reference numerals, after insertion in an internal groove 14 of the socket (bell) 16 of a socket pipe 18, of which the level internal shelf 20 is also partially illusrated. The upper end of the socket and the gasket as shown in the drawings are referred to as the external ends and one of said ends will preferably flush to the other. The groove 14 protrudes into the socket wall 24 a distance F, the lower rim of the recess being about half-way between the top and the bottom of the socket. Placement in this half-way position plus location of the internal sealing lip (10, 12) near to the external end of socket 16 allows for retention of sealing during slight relative movements of socket 16 and spigot 22. Above the socket pipe 18, the spigot end 22 is positioned for insertion in a sealing manner.

The gasket 2 to 12 is pushed into the socket, the external sealing lip 4 sliding along the inner wall 24 of the socket 16 and then resting against the lower rim of the groove 14. Thereupon the sealing cylinder 26 is poured. This sealing cylinder presses the outer rim of the lip 4 in a sealing manner against the equally curved lower side of the groove 14 and encompasses the ball 8 in such a manner that the gasket is retained. A sealing connection is normally established only between the cylinder 26 and the inner wall of the socket 16.

Figure 3:
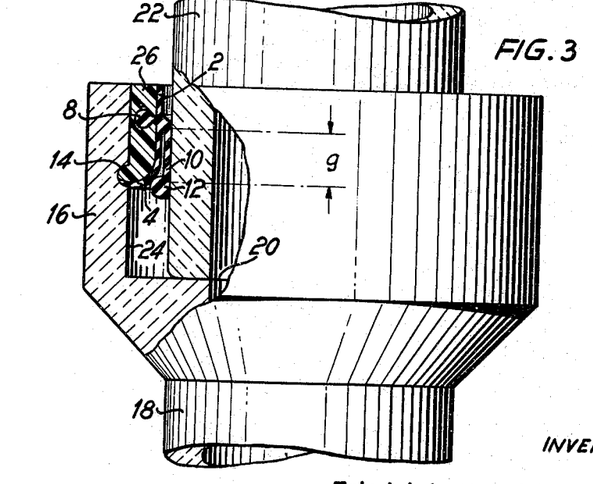
FIGURE 3 shows the construction of FIGURE 2 after the spigot end has been inserted.

As can be seen from FIGURE 3, the outer diameter of the spigot end 22 is somewhat smaller than the inner diameter of the cylindrical shell 2 minus double the wall thickness of the ring 10. Thus, the spigot end can be inserted according to FIGURE 3, wherein the previously radial ring 10 now rests axially against the outer surface of the spigot end 22 which is shown in partial section. Also the O-ring 12 rests against the outer wall of the spigot end 22 in this case simultaneously rests on the outer surface of the cylindrical shell 2. This provides a very effective seal. This preferred contact of the O-ring with both spigot 22 and gasket 2 is attained when half the difference between the inner diameter of the gasket 2 and the inner diameter of 12 is about equal to the distance g indicated in FIGURE 3. This places the O-ring at the location where the gasket diverges from its parallel relationship to the inserted spigot. This situation is shown in FIGURE 3.

It can be seen without difficulty that, although in the present case the spigot end sits upon the level shelf 20, a seal can also be obtained when the spigot end extends only slightly beyond the O-ring 12. Thus, there is a marked freedom which can be extended, as required, by changing the length of the socket 16, up to about half the length of the socket pipes.

Figure 4:
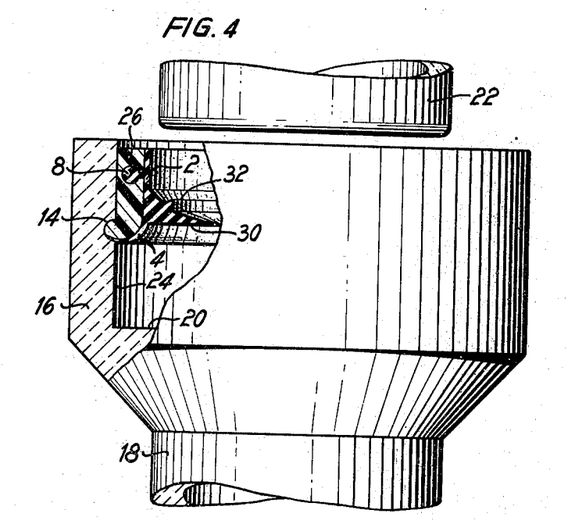
FIGURES 4 and 5 show a socket pipe seal with a gasket whose inner lip is provided with an additional lip on its outer surface.

FIGURE 4 shows a different embodiment in a similar position to FIGURE 2. In this case, the cylindrical shell 2 carries on its inner side a first lip 30 which is approximately triangular in cross section and is beveled toward the top so as to obtain an intermediate shape between a radial lip and a lip extending obliquely toward the inside. Such lips result in a very good seal. In case the outer surface of the spigot end 22 is uneven, a second lip 32 can be provided at some distance from the inner rim of the triangular lip 30.

Figure 5:
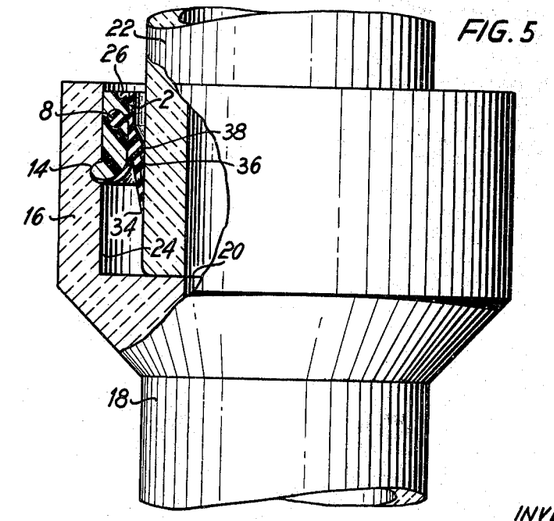

The effect of such a construction can be seen from FIGURE 5. The entire lip is bent downwardly, the tip of the approximately triangular lip resting at point 34. The point of abutment of the additional lip is designated by 36. The foot of the lip in this case is so rigid that, with the chosen relationship of diameters, this foot also still engages the outer wall of the spigot end 22, at 38.

Figure 6:
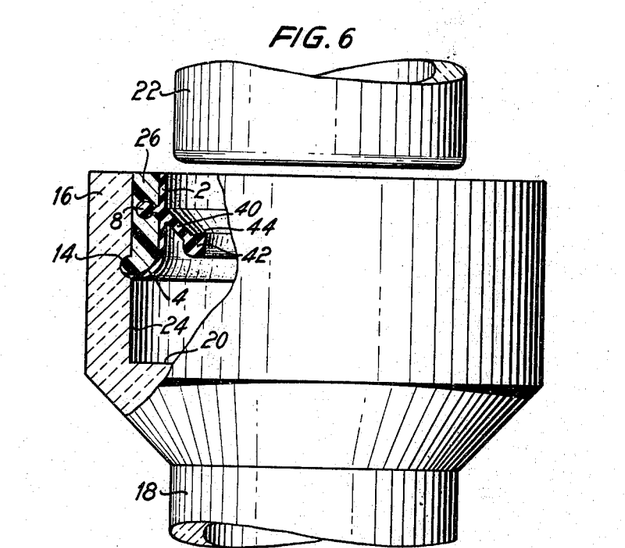
FIGURES 6 and 7 show a socket pipe seal whose gasket carries, on its internal sealing element, an O-ring with an additional lip.
Figure 7:
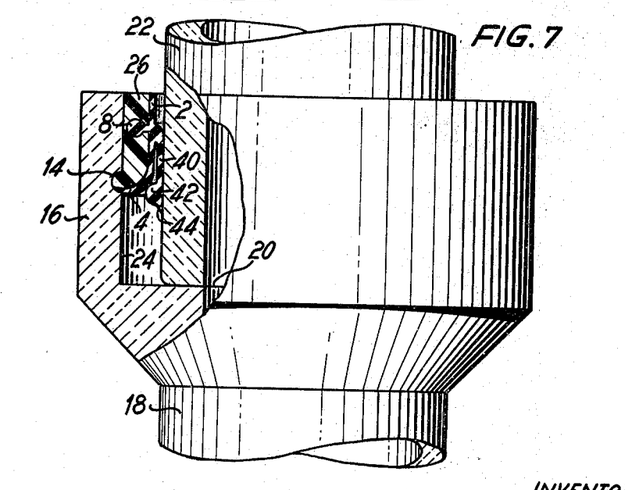

FIGURES 6 and 7 show a further development of the embodiment of FIGURES 1 to 3. The cylindrical shell 2 in this case does not carry a radially positioned ring, but a ring 40 extending obliquely downwardly, thus forming a truncated cone. At the inner end, this truncated cone ring 40 carries an O-ring 42 provided with an additional lip 44, this lip being oriented upwardly, i.e., away from the socket level surface 20.

When the spigot end 22 is inserted in such a construction, the conical ring 40 establishes contact just as the radial ring 10 in FIGURE 3, and the O-ring 42 behaves in a similar manner to the O-ring 12; however, the third lip 44 is now rotated toward the inside, i.e., in the direction toward the level shelf 20 of the socket, and extraordinarily strong tractive forces are produced in the elastic material to provide a secure seal.

Figure 8:
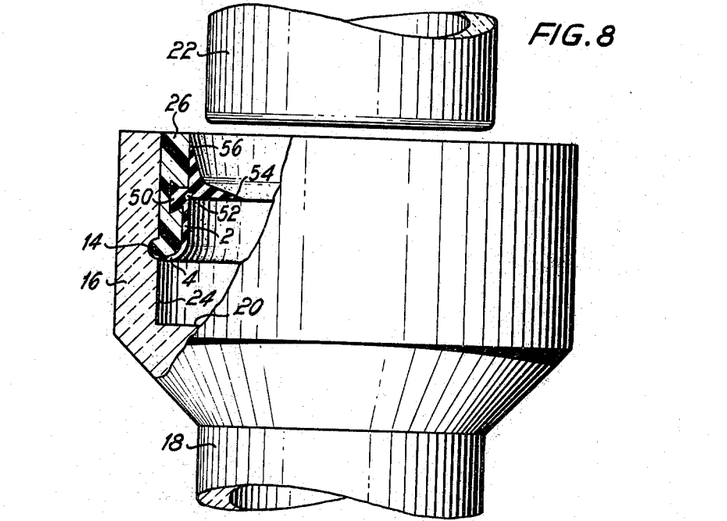
FIGURES 8 and 9 illustrate a socket with a gasket having a guide lip and a trailing lip at the edge of the socket.
Figure 9:
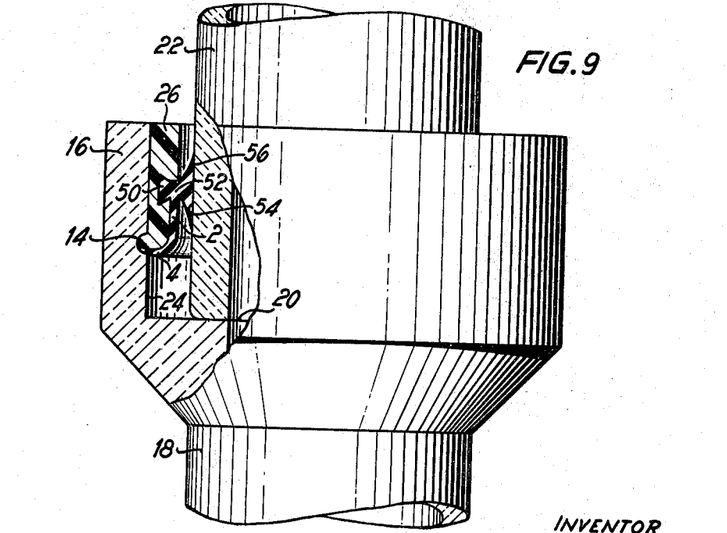

A further embodiment with an approximately triangular radial lip is shown in FIGURES 8 and 9. The cylindrical shell 2 is provided, for anchoring purposes, with an annular rib 50 on the outside, whose cross section is of dovetail shape. This annular rib 50 not only serves for anchoring the cylindrical shell 2 in the sealing cylinder 26, but additionally serves for providing rigidity between the outer lip 4 and the internal lip to be described in the following. This reinforcement is suitable for maintaining a circular cross section of the cylindrical shell at the place where the internal lip is located, even in case the socket is not entirely circular. Thereby, it is prevented that the manufacturing tolerances of socket and spigot add in such a manner that the sealing can no longer follow.

Via a root 52, the cylindrical shell 2, which is not extended upwardly in this case, and the outer annular rib 50 are connected with an internal lip construction. This lip construction consists of a radial, approximately triangular guide lip 54 and an axial, likewise approximately triangular trailing lip 56. As can be seen without difficulty, the free, externally located surface of the guide lip 54 begins already at a radius which is larger than the radius of the spigot end 22. Correspondingly, the positions illustrated in FIGURE 9 result when the spigot end is inserted. The guide lip 54 is pressed downwardly and first serves for guiding the spigot end. The trailing lip 56 is carried along, is detached from the sealing cylinder 26, which does not adhere tightly to this trailing lip, and likewise sealingly contacts the outer wall of the spigot end 22. The root 52, in conjunction with the external rib 50, is strong enough to prevent disengagement of the gasket from the grouting mass during this process. In this manner, two differently extending sealing lips are obtained. The sealing lip 54 seals against internal excess pressure, while the sealing lip 56 seals against an external excess pressure. It is possible without difficulty to shift the two lips 54, 56 further toward the interior, i.e., toward the axis, and to extend the cylindrical shell 2 to the upper end of the sealing cylinder.

Figure 10:
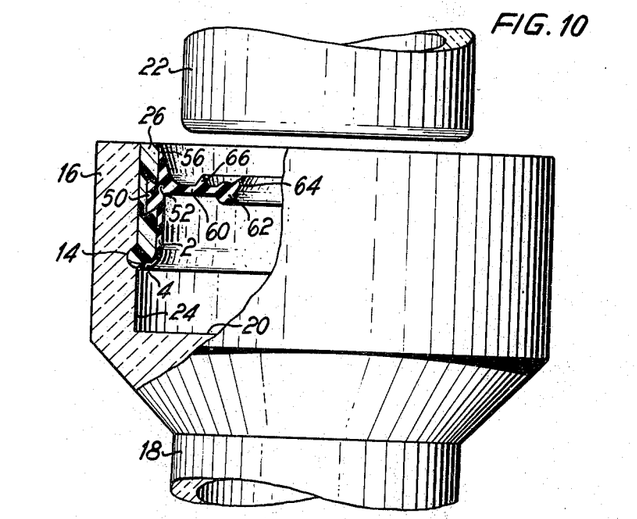
FIGURES 10 and 11 show the construction of FIGURES 8 and 9 with two additional lips and O-ring.
Figure 11:
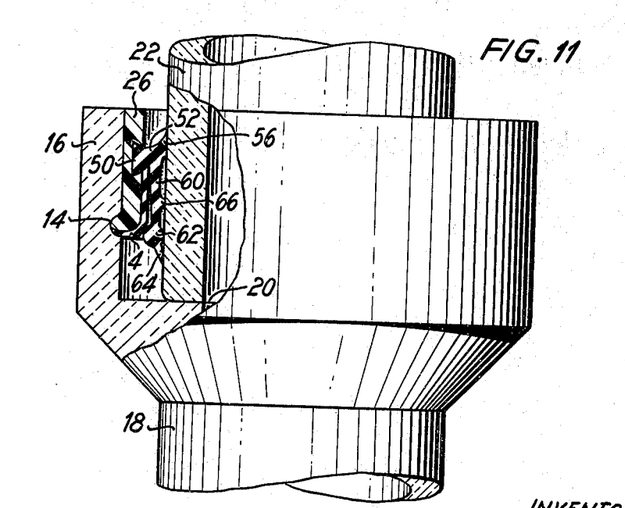

Finally, FIGURES 10 and 11 illustrate a combination of the features of FIGURES 8 and 9, on the one hand, and 6 and 7, on the other hand. The external rib 50 is constructed to be even stronger, whereas the root 52 is fashioned to be somewhat weaker. Thereby, the movability of the internal sealing lips is increased. The guide lip in this case consists of a radial ring 60 having an O-ring 62 at the inner rim. The O-ring 62 carries an auxiliary lip 64, and on the radial ring 60 there is also provided an auxiliary lip 66 on the outside. The trailing lip 56 is similarly constructed as in FIGURES 8 and 9.

When inserting the spigot end 22, the third lip 64, the O-ring 62, the second lip 66, and the trailing lip 56 contact the outer wall of the spigot end 22, so that a very effective seal is obtained affording protection against external and internal pressures.

The cylindrical shell 2, or the trailing lip 56 and the sealing mass 26, do not necessarily have to extend up to the upper rim of the socket. Rather, they can also be displaced somewhat toward the inside, as shown in FIGURES 4 and 5, so that they are protectively surrounded during transport and installment.

Figure 12:
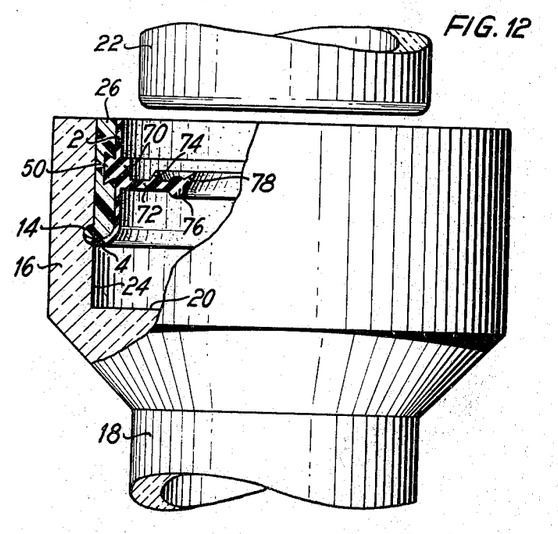
FIGURES 12 and 13 show a similar arrangement to FIGURES 10 and 11, but without a trailing lip.
Figure 13:
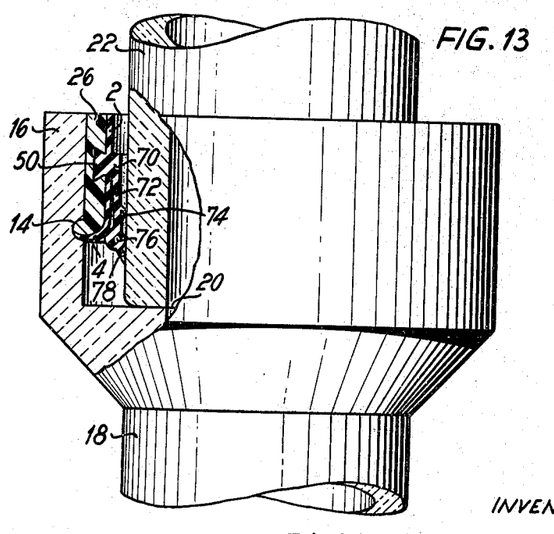

In the embodiment of FIGURE 12, the cylindrical shell 2 which rests in the groove 14 together with the external lip 4, has an internal reinforcement 70 lying oppositely on the outer surface of the external annular rib 50. A radial, flat ring 72 extends from the reinforcement, this ring being positioned, in the illustrated embodiment, at the lower end of the reinforcement, but also being positionable on the center or at the upper rim of the reinforcement. The arrangement illustrated results, however, in a particularly good support, as can be seen from FIGURE 13. The radial ring 72 carries a second lip 74 and an O-ring 76 with an auxiliary lip 78. Upon insertion of the spigot end 22, the position of FIGURE 13 is attained wherein the auxiliary lip 74, the O-ring 76, and the third lip 78 are sealingly effective. The O-ring 76 rests against the point where the cylindrical shell 2 changes over into the external lip 4.

While other proportions within limits are feasible, the proportions shown in the drawings are to scale in a preferred embodiment of the invention.

The inventive socket pipe packing for ceramic sewer pipes is characterized by a gasket of elastic material adhering to the inner wall of the socket by means of a sealing element attached on the side of the socket shelf. The outer diameter of the sealing element, in the rest position, is larger than the inner diameter of the socket. The gasket, socket and the sealing element forming a cast mold. The invention is also characterized by at least one sealing element projecting toward the spigot and whose inner diameter is smaller than the outer diameter of the spigot end; and by a sealing cylinder tightly and firmly adhering to the material of the inner wall of the socket and positively coupled with the gasket, this sealing cylinder not exceeding the height of the gasket.

For producing this inventive socket pipe packing, no mold is necessary. The costs for the mold, the preparation of the mold for casting, the cleaning, the application of the separating agent, the removal of the casting from the mold, and all manufacturing errors connected therewith are eliminated. Only two main process steps remain: the insertion of the gasket, preferably consisting of synthetic or natural rubber, in the socket, and the casting of the sealing cylinder. The sealing cylinder, which preferably is made of a polyester, another synthetic material, or a bituminous mass, firmly connects the gasket, tightly and permanently, with the inner wall of the socket. The pipe contents do not touch the sealing cylinder and thus the cylinder need not be of a resistant nature. Only the material of the gasket, or at least the material of its surface, is chosen to be corrosion-proof with respect to the contents of the pipes.

The gasket is particularly simple if the sealing cylinder is chosen to adhere to the gasket tightly and firmly. In case this is impossible, the gasket is preferably provided on its internal side with anchoring elements extending into the sealing cylinder.

If these anchoring elements are to secure the gasket against shifting in the axial direction, they are advantageously made of at least one rib extending all around and having, for example, a dovetail-type cross section. However, if the gasket is to be secured against rotation, the anchoring elements are preferably fashioned in the shape of nubs.

A gasket standing on the socket shelf would make, during casting, a flawless seal only if the socket level were relatively smooth. Normally, however, the casting mass can leak between the socket shelf and the gasket. Therefore, the gasket is provided with an additional, elastically deformable external packing element, this element being advantageously fashioned as a lip adhering to the inner wall of the socket (bell).

The gasket should be provided on its inside with at least one sealing element whose smallest diameter is smaller than the outer diameter of the spigot end to be inserted therein. When inserting the spigot, the lip is widened and elastically engages the spigot end.

The inventive construction of the socket pipe seal makes it possible to place the inner sealing element on the outer end of the gasket, which end faces the exit of the socket. Thereby, with the sealing elements being fully effective, a maximum axial movability of two ceramic pipes inserted into each other is accomplished.

The simplest embodiment of the inner sealing element consists of a lip of an approximately triangular cross section. This lip advantageously is oriented obliquely into the interior of the socket since in this position it opposes best the pressure of the medium against which it is to exert its sealing effect. However, there are other cases wherein a radial positioning of the lips is to be preferred.

If the gasket is provided with only a single internal sealing element, there is the danger that, on the circumference at which the lip engages the spigot end, there is such an unevenness in the surface that the lip cannot ensure the seal at that place. In such a case, two lips provided one behind the other would be advantageous, but such a design would be difficult to produce, since the second lip would be in the rear when the mold is opened and thus would require a mold that could be disassembled. Therefore, it is better to provide the first lip extending into the interior of the socket with an additional lip on the side facing the exit of the socket. If the main lip is bent over when the spigot end is inserted, the additional lip engages the spigot end along a circumference which is different from the circumference on which the main lip rests. Thus, the same objective is accomplished as if two lips were involved, with a method which is simpler. The thus-provided additional lip permits manufacture without the use of a mold which can be disassembled.

Particularly strict are the requirements with respect to the socket pipe seals of the present invention when they are used in crude ceramic socket pipes having large manufacturing tolerances. These pipes can be oval, and the surfaces can be of an undulating shape. Additionally, the ceramic sewer pipe placed in the ground lies practically horizontally and thus is pressed downwardly under the effect of the burden of the earth and its own weight, as well as under the load of the medium flowing through the pipe. The pipes inserted into one another therefore are in most cases not coaxial with one another.

The high requirements with respect to sealing caused by the above conditions are advantageously met by fashioning the inner sealing element as a lip which has, close to its end, a (reinforcing) thickened portion, for example in the form of an O-ring. This thickened portion can be entirely at the end of the lip, or it can be set back somewhat. Advantageously, the inner diameter of this thickened portion is maintained smaller than the smallest outer diameter of the spigot pipe end to be inserted.

The lip carrying the O-ring can extend radially or obliquely into the interior of the socket (bell). Preferably, the O-ring, for the reasons already mentioned above, is provided with an additional lip.

The above-mentioned external sealing element elastically engages the inner wall of the socket and prevents the egress of the sealing cylinder, without having to press the gasket thereagainst. The sealing cylinder is securely protected against attack by the medium conducted within the pipe.

The sealing cylinder can consist of bituminous material. Particularly advantageous are cold-setting plastics, such as, for example, polyesters or polyurethanes, or also foamed plastics. The plastics can have fillers admixed thereto. For improving the adhesive strength of these materials, it is necessary, under certain circumstances, to provide priming elements on the inner wall of the socket.

In case the socket pipes are used specifically for conducting corrosive acids, an acid cement is preferably used to make the sealing cylinder for reasons of safety, although the medium present in the pipe normally does not directly contact the sealing cylinder. The quality of the gasket material is selected in correspondence with the medium flowing through the pipe.

In an analogous manner, the present invention can also be applied to slip-over bells. In such a case, two such socket pipe packings are provided in the slip-over bell, and the spigot ends are inserted from both sides. Advantageously, in this case the two gaskets are combined to a single gasket having corresponding sealing elements on both sides.

When inserting the gasket in a socket which is not round, the inner sealing element of the gasket should not be susceptible to bending, or only to a limited extent, by the forces effective at the outer sealing element. Only in such a case can it be expected that the internal sealing element, in turn, is capable of sealing against a spigot end which is not round.

In this case, there is provided a ring resistant to bending between the sealing edge of the internal sealing element and the outer edge of the external sealing element For this purpose, preferably the bending resistance of the internal sealing element is made substantially larger than that of the external sealing element. In this manner, it is accomplished that when the external sealing element is deformed, the internal element is influenced not at all or only to a limited extent. Correspondingly, the internal sealing element will be fashioned, for example, to be rigid in the radial plane, and the external sealing element will be fashioned to be as soft as possible. Even if the external sealing element is compressed to an oval shape by a non-circular socket, the internal sealing element remains circular and can adjust to a non-circular spigot pipe. In contradistinction thereto, if the internal sealing element were to be deformed also by the forces effective from the socket, the difficulties encountered when attempting to provide a seal are increased. In addition to the tolerances of the outer diameter of the pipe, there would have to be added the tolerances of the inner diameter of the socket.

The larger the difference is in the radial rigidity of both sealing elements, the larger the unevennesses and oval shapes that can be compensated for by the external sealing element when inserted in the socket.

An increase in the rigidity of the internal sealing element is additionally obtained, without particular expenditures, if the anchoring element engaging the sealing cylinder, such as, for example, a ring with a dovetail cross section, is positioned in the plane of the internal sealing element or between the internal and external sealing element, and if it is rigid.

The transmitting of a deformation of the external sealing element upon the internal sealing element can also be avoided by providing a rigid central portion between both sealing elements. This central part can additionally be reinforced by shaping its cross section in a particular manner.

In order that the sealing gasket, when inserted, always assumes the desired position, the external sealing element is suitably matched with a groove which is already worked into the socket during its manufacture, advantageously before the ceramic pipe is baked. The external sealing element resiliently engages this groove when the gasket is inserted.

The above-described socket pipe seals provide an excellent seal between the sealing cylinder and the socket pipe, on the one hand, and, under internal excess pressure, between the spigot end and the internal sealing element, on the other hand. However, there is sometimes need to make this seal tight not only against an internal excess pressure, but also with respect to an external excess pressure. If the internal sealing element consists of a simple lip, this lip is deformed when the spigot end of the pipe is inserted into the socket in such a manner that it reliably seals with respect to an internal pressure. It could even be said that when the internal pressure is increased, the compression force effective upon the lip increases, so that the seal becomes more effective when the internal pressure increases.

However, if such a lip is under stress by an external excess pressure, the external pressure lifts the lip from the spigot end of the ceramic pipe inserted into the bell, i.e., the seal springs a leak.

In order to provide a seal not only with respect to internal excess pressure but also with respect to external excess pressure, the internal sealing element can be provided not only with an approximately radially positioned "guide lip" moving in front of the spigot end during the insertion of the latter, but also with a "trailing lip" oriented parallel to the axis toward the outside and following the guide lip. These lips are connected, by their root portions, more rigidly with each other than are the two lips with respect to the remainder of the gasket, the smallest diameter of the trailing lip being larger than the largest external diameter of the spigot pipe.

Both lips together form a type of socket (bell). The spigot end of the pipe is inserted therein. In this procedure, the guide lip is pivoted toward the inside and brings, on account of the rigid connection, the trailing lip in the same direction of rotation. During this movement, the trailing lip is placed against the pipe.

It can be seen from the above that the guide lip and the trailing lip are directed oppositely in the fuctioning position. The guide lip points toward the inside and seals against the internal pressure, while the trailing lip points toward the outside and seals against the external pressure.

Both lips, which are combined in one root, can be placed axially at the outer end of the gasket. It is also possible to provide these lips in an offset manner toward the inside of the gasket. A particularly favorable position for the root at the gasket results when the root is displaced axially toward the inside by the length of the trailing lip; the trailing lip in such a case can form an extension of the gasket toward the outside. In such case, the external portion of the gasket, which serves outside of the root as the mold, is omitted, and the trailing lip forms, during the casting, a portion of the mold. However, if the trailing lip does not form a connection with the mold mass, it is brought, when the spigot end is inserted, by the guide lip in the same easily rotating manner, and is moved toward the outside of the sealing pipe, as in the other constructions.

The definitions in the claims "cylinder" and "cylindrical" are not limited to a circular cylinder and include all hollow elongated structures used in the trade; they are not limited to a "right cylinder" but include also an "oblique cylinder."

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

I claim:

1. An integral cylindrical sealed assembly of pipes such as ceramic sewer pipes comprising a rigid pipe socket, a resilient sealing gasket, a rigid pipe spigot and a cast sealing cylinder, all in approximately coaxial alignment; the internal wall (24) of said pipe socket having a diameter greater than the outer diameter of said spigot, the deepest part of said socket being its shelf (20) lying transversely to said internal wall (24); said gasket having a diameter intermediate between that of the internal wall (24) and the outer diameter of said spigot; said gasket inserted in said socket and having an external sealing means extending integrally and radially outward from the gasket end facing said shelf (20); said external sealing means fitting sealingly in an annular recess in said internal wall (24), thereby forming a ring-shaped mold; said cylinder situated only within said mold and having a shape conforming to the interior surfaces of said mold; said cylinder adhering to said socket and fittingly coupled to said gasket; said gasket having an internal sealing means projecting inwardly; said spigot having its outer diameter greater than the minimum free diameter of said internal sealing means; said spigot inserted within said socket and said gasket.

2. An assembly as in claim 1, said gasket further provided, on its side facing internal wall (24), with anchoring elements extending into said cast sealing cylinder.

3. An assembly as in claim 1, the internal sealing means of said gasket being a first lip.

4. An assembly as in claim 3, said first lip being provided with a second lip on the side facing the external end of said socket.

5. An assembly as in claim 1, the internal sealing means of said gasket being provided with a reinforcement close to its inner rim.

6. An assembly as in claim 5, said reinforcement being an O-ring.

7. An assembly as in claim 6, said O-ring having at least one third lip.

8. An assembly as in claim 1 said gasket further having a bending-resistant ring between the internal sealing means and the external sealing means.

9. An assembly as in claim 8, the bending resistance of the internal sealing means being substantially larger than that of the external sealing means.

10. An assembly as in claim 1, said gasket further having a rigid, central portion, said internal and external sealing means attached to said rigid central portion.

11. An assembly as in claim 1, the internal sealing means of said gasket having an approximately radial guide lip and an approximately axially parallel trailing lip, the latter pointing away from the internal shelf (20) of said socket, the guide lip and the trailing lip being connected with each other by a common root having a rigidity greater than the connection with the remainder of the gasket, the largest outer diameter of the spigot end being larger than the smallest diameter of the sealing rim of the guide lip.

12. An assembly as in claim 11, said root displaced axially from the external end of said socket by the length of the trailing lip, said trailing lip in the rest position forming an extension of the gasket.

13. An assembly as in claim 6, said O-ring being located in assembly at the point where gasket diverges from said spigot into said external sealing means, said O-ring being in contact with gasket and in sealing contact with spigot.

14. An assembly as in claim 3, said first lip projecting prior to assembly radially toward the interior of the socket.

15. An assembly as in claim 3, said first lip projecting prior to assembly obliquely toward the interior of the socket.

16. An assembly as in claim 1, said external sealing means being an elastically deformable lip (4), the lip resting against the lower side of the annular recess (14) and separated from the upper side, whereby said poured sealing cylinder presses the lip (4) in a sealing manner against the lower side of the recess.

References Cited

UNITED STATES PATENTS

| | | |
|---|---|---|
| 1,856,581 | 5/1932 | Mitchell. |
| 1,856,890 | 5/1932 | Stokes. |
| 2,451,070 | 10/1948 | Chamberlain ______ 285—230 X |
| 2,501,943 | 3/1950 | Jack. |
| 2,955,322 | 10/1960 | Hite. |
| 3,064,983 | 11/1962 | Halterman. |
| 3,135,519 | 6/1964 | Ligon et al. |
| 3,150,876 | 9/1964 | Lafferty. |

FOREIGN PATENTS 1,055,460  4/1959  Germany.

LAVERNE D. GEIGER, Primary Examiner

J. S. MEDNICK, Assistant Examiner

U.S. Cl. X.R.

277—207, 225; 285—230, 291, 379